Figure 4:
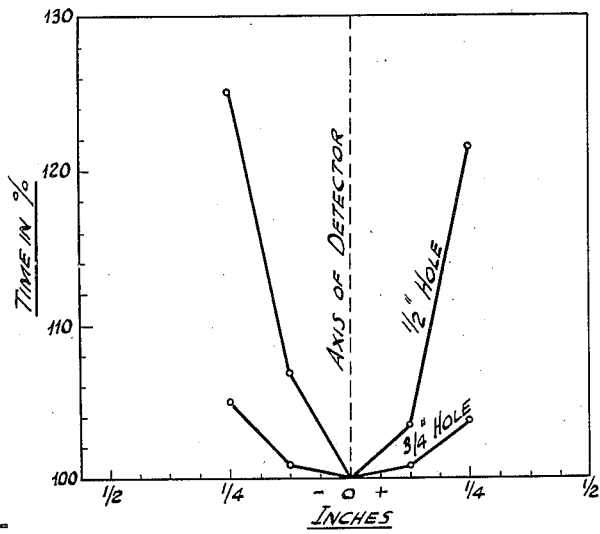

March 21, 1950          G. HERZOG          2,501,173
DEVICE FOR MEASURING THICKNESS
Filed July 12, 1945          2 Sheets-Sheet 1
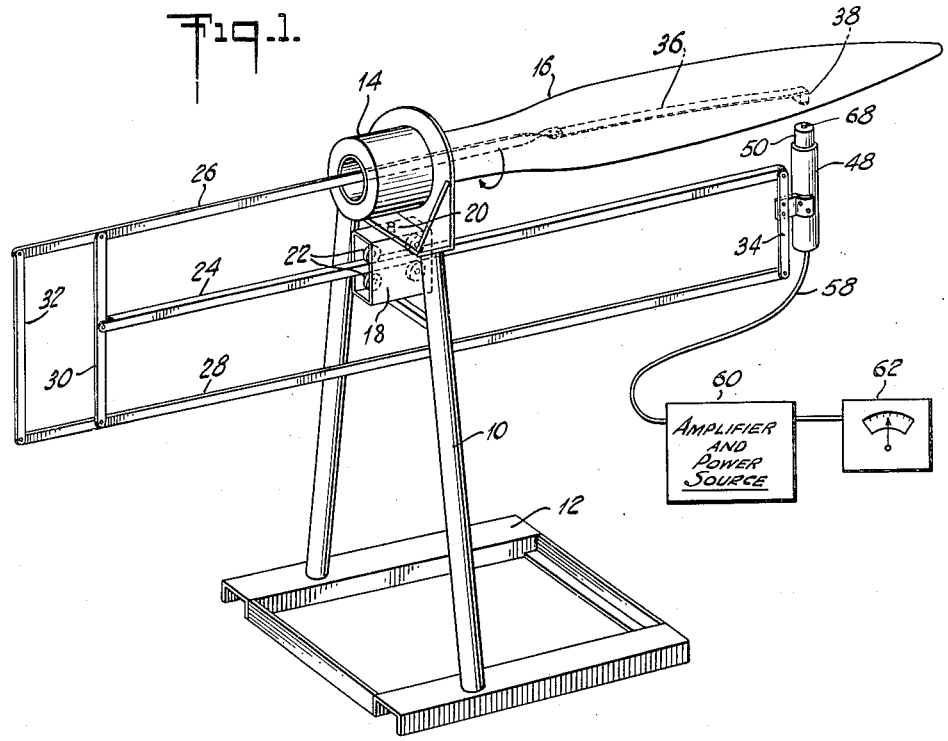
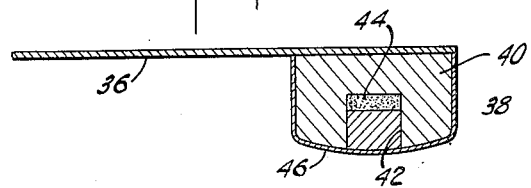
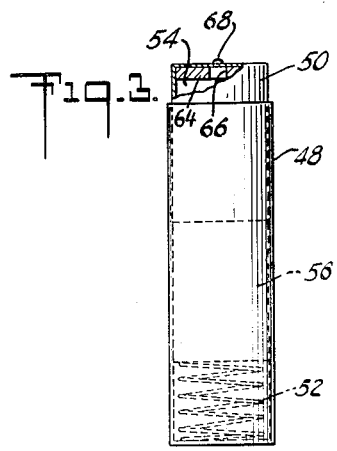
INVENTOR
GERHARD HERZOG.
BY
ATTORNEY March 21, 1950   G. HERZOG   2,501,173
DEVICE FOR MEASURING THICKNESS
Filed July 12, 1945   2 Sheets-Sheet 2

INVENTOR
GERHARD HERZOG.
BY Daniel Styler
ATTORNEY

Patented Mar. 21, 1950

2,501,173

UNITED STATES PATENT OFFICE 2,501,173

DEVICE FOR MEASURING THICKNESS

Gerhard Herzog, Houston, Tex., assignor to The Texas Company, New York, N. Y., a corporation of Delaware Application July 12, 1945, Serial No. 604,692

7 Claims. (Cl. 250—83.6)

This invention relates to the measuring of thickness by radioactive means and more particularly to an apparatus for measuring the thickness of the wall of a tube or an irregular object such as a hollow propeller blade, at any desired point or points. The principal object of the invention is the provision of means whereby accurate thickness measurements may be made without any damage to the blade such as might otherwise be caused by the drilling of holes for the insertion of micrometer calipers or the like. Due to the size and shape of propeller blades, it is substantially impossible to use calipering devices of the scissors type.

In accordance with the invention a small source of radioactive material is inserted through the opening at the shank of the propeller and moved to a location where the wall thickness is to be measured. Outside the blade and directly opposite the source a detector of gamma rays is located. The intensity of the gamma rays which are emitted from the source is reduced by absorption while the rays pass through the blade wall and the intensity of the emerging ray beam, therefore, decreases with increasing wall thickness. The intensity value as measured with the detector may be calibrated in terms of the wall thickness.

The major difficulty of such an arrangement lies in securing a constant relative position of the source with respect to the detector. Minute variations in the distance between the two, or in their alignment, cause changes in the output of the detector which are large compared to the changes which are due to the small variations in wall thickness in which one is interested.

To overcome this difficulty and also to obtain greater accuracy an arrangement has been provided whereby the distance between the source and the detector varies in conformity with the thickness of the wall, thus the source is pressed against the inside surface of the wall and exactly diametrically opposite a detector is pressed against the outside surface. The distance between the two is thereby always equal to the thickness of the wall and this arrangement has a particularly beneficial effect. If, for example, the wall thickness increases, the intensity of the gamma ray beam decreases, not only due to the increase in absorption in the wall but also due to the increase in the distance from the source to the detector.

The instrument in general consists of a holder into which the propeller blade can be inserted in a horizontal position and which permits rotation of the propeller around its longitudnial axis. Mounted on the same frame-work as the holder is a pantograph arrangement which supports on one of its arms the radioactive source on the inside and in contact with the blade. On a second arm of the pantograph and on the outside of the blade the detector is supported. The pantograph can be moved slidably along the axis of the blade and it can also be slightly rotated in a horizontal plane so that the source will be maintained on the axis of the detector. The possibility of rotating the blade, of moving and rotating the pantograph, and of tilting the axis of the detector enables one to reach every point inside the blade to keep the detector axis perpendicular to the wall. This flexibility is quite important because of the complicated shape of the surface of propeller blades.

Figure 5:
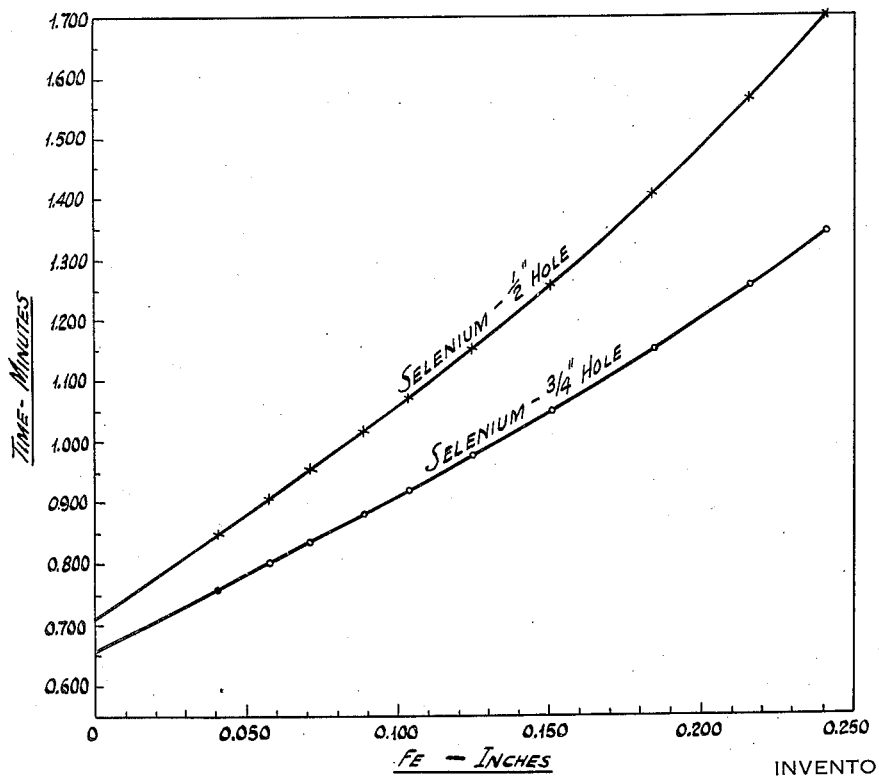

For a better understanding of the invention reference may be had to the accompanying drawings in which:

Figure 1 is an isometric view of the apparatus for measuring the thickness of a propeller blade wall, Figure 2 is a sectional elevation of the holder for the radioactive source, Figure 3 is a vertical elevation partly in section of the detector housing, Figure 4 is a curve showing the influence of sidewise motion of the source with respect to the axis of the detector, and Figure 5 shows a pair of calibration curves.

As illustrated in Figure 1, a framework 10 is shown as supported on a base 12 and having at its upper end a bearing 14. The propeller blade 16 is inserted with its shank in the bearing 14 and it is thus possible to rotate the blade about its horizontal axis. Below the bearing 14 a box 18 is mounted on a vertical axle or shaft 20, the box 18 containing two pair of vertically separated rollers 22. A framework or linkage in the form of a pantograph consisting of three horizontal arms pivoted to three substantially vertical cross members or links is adapted for longitudinal movement in the plane of the propeller blade. The middle arm 24 of the frame has a rectangular cross section and is supported and guided between the rollers 22 so that the entire pantograph frame can be moved horizontally. Due to the roller box 18 being pivoted on the shaft 20 the frame can also be rotated to a slight extent in a horizontal plane. The other two horizontal arms 26 and 28 are connected pivotally to the middle arm 24 by means of the vertical links 30, 32 and 34. The uppermost arm 26 extends into the propeller blade and terminates in a thin, flat, metal strip 36 which may be attached by riveting, or otherwise, to the end of arm 26. To the end of the strip 36 is attached a holder 38 containing the radioactive source, and due to the flexibility of the strip 36 and the weight of the source holder 38, the strip will curve downwardly until the holder contacts the inner surface of the propeller blade wall.

The holder 38 shown more clearly in Figure 2 comprises a block 40 preferably formed of a metal having a high density and high atomic number, such as lead. It has been found that "Mallory 1000," a machinable alloy which contains over 99% tungsten, is very well suited for this purpose. The contact side of the block 40, i. e., the side which engages one surface of the propeller blade wall, is slightly convex and this side of the block is provided with an opening 42. The proportions of the block 40 and the hole 42 are such that the walls of the block will be sufficiently thick to absorb to a high degree the gamma rays which are emitted from the source in directions other than toward the blade wall. This is important in order to reduce the scattering effect of adjacent portions of the wall and of the back wall of the propeller blade 16.

As stated in my copending application, Serial No. 604,693 filed concurrently herewith, it is preferred to use as a source of radiation an artificially radioacitve substance emitting homogeneous gamma rays having a predetermined energy. As an example, radioactive selenium in the form of $H_2SeO_4$ dissolved in nitric acid and evaporated to a dry powder may be used, this powder being placed in the upper portion of the hole 42 as is indicated at 44 in Figure 2. The lower portion of the hole 42 is then filled with molten paraffin which prevents any dislocation of the radioactive substance within the holder. The block 40 is then placed in a thin cover member 46 of a substance such as aluminum and the device attached by any suitable means to the end of the flexible strip 36.

Referring to Figures 1 and 3, attached to the vertical link 34 is an open topped tube 48, this tube serving to support in slidable relation the cylindrical detector housing 50. As is shown more clearly in Figure 3 the housing 50 rests upon a coil spring 52 within the tube 48 which serves to press the upper end of the detector housing against the outside surface of the propeller blade. The detector 54 is mounted in the upper portion of the housing 50 and within the lower end of the housing and connected electrically to the detector 54 is a preamplifier 56, the preamplifier being connected in turn by a cable 58 to a power supply and amplifier 60 and an indicating or recording device 62 as shown in Figure 1.

For the detector 54 any suitable device may be used such as a gamma ray counter or an ionization chamber. A counter will be referred to hereinafter. In early experiments the counter was not shielded against gamma rays, i. e., it was exposed in all directions. It was found, however, that with such an arrangement neighboring parts of the propeller blade wall, as well as the back side of the blade, influenced the readings due to some of the gamma rays being scattered in or from these parts back toward the detector. This difficulty is overcome by placing a lead plate 64 of about ¼ inch thickness inside the aluminum housing 50 between its end plate and the end plate of the detector 54. The plate 64 is provided at its center with a hole 66 coaxially disposed with reference to the longitudinal axis of the detector. The shielding effect is obviously improved by reducing the diameter of the hole 66 but at the same time the area over which the thickness is averaged is correspondingly reduced. This reduction in area has one disadvantage in that the alignment between the source 38 and the longitudinal axis of the detector 54 becomes more critical with a smaller hole. On the other hand, the curve which shows the relation between the measured gamma ray intensity and the thickness of the wall becomes steeper with decreasing hole size, an effect which is advantageous.

In order to determine the optimum hole size, experiments were made using hole sizes of ½ inch as compared to hole sizes of ¾ inch. Figure 4 shows curves which represent the influence of a sidewise motion of the source with respect to the axis of the detector. The deviation from the axis is plotted as the abscissa and the "time" for a given number of discharges in the counter is plotted as the ordinate. The "time" for exact alignment of the source on the axis is taken as 100. It can be seen that the error due to a shift of the source from correct alignment is appreciably larger with a ½ inch hole than it is with a ¾ inch hole and the latter sized hole was therefore decided upon. In Figure 5 are shown calibration curves for the two hole sizes using a source of radioactive selenium. The thicknesses of the steel interposed between the source and the detector are plotted as the abscissa and the time in minutes for 76,800 pulses in the detector is plotted as the ordinate. The curve for the ½ inch hole is steeper than that for the larger hole but as stated above, the larger hole was decided upon because of the advantage in the question of alignment. It was experimentally determined that with a ½ inch hole the thickness is averaged at the propeller blade over an area of .25 square inch whereas with the ¾ inch hole the area covered is .4 square inch.

The length of the arm 26 is so adjusted that the source 38 is maintained on the longitudinal axis of the tube 48 and a permanent alignment between the source and the detector is thus assured. After a point on the blade 16 is selected where a thickness measurement is to be made the pantograph frame is moved until the center of the end plate of the detector housing 50 touches that point. Depending on the shape and curvature of the propeller surface, this may necessitate the rotation of the propeller blade 16 about its horizontal axis in the bearing 14, the sliding of the pantograph frame longitudinally in the roller bearing 22, and a slight rotation of the pantograph about the shaft 20. In order to assure that the detector housing 50 is maintained perpendicular to the selected point on the blade surface, the upper end plate of the detector has at its center a small contact point 68, this point being elevated by $\frac{1}{32}$ inch above the flat surface of the detector plate. As long as the raised point 68 actually touches the blade 16 the longitudinal or vertical axis of the detector can deviate very little from a direction directly perpendicular to the surface of the blade. It has been proven that such a small deviation does not cause any determinable error in the readings.

It will thus be seen that an apparatus has been provided which will provide accurate measurements of the thickness of an object such as a hollow propeller blade without the necessity of drilling any holes through the blade or mutilating it in any manner whatsoever.

Although the invention has been described with reference to the measuring of the thickness of propeller blade walls, it is to be understood that elements other than propeller blades can be measured, for example, lengths of tubing either round, elliptical or irregular in cross section, it being necessary merely to mount the element in the bearing 14, or one similar thereto, so that it can be rotated about its longitudinal axis.

Obviously, many modifications and variations of the invention, as hereinbefore set forth, may be made without departing from the spirit and scope thereof, and therefore only such limitations should be imposed as are indicated in the appended claims.

I claim:

1. A device for measuring the thickness of the wall of a hollow propeller blade comprising means for supporting said blade in a substantially horizontal position rotatably about its longitudinal axis, an elongated pantograph frame mounted substantially horizontally on said supporting means in a plane containing a longitudinal axis of said blade and capable of longitudinal movement with respect to said blade, said frame including horizontal arms and substantially vertical links, one of said arms being adapted to be partially disposed within said blade, a source of penetrative radiation mounted on the free end of said arm within said blade and a detector of penetrative radiation supported by one of said links outside said blade and opposite said source.

2. A device for measuring the thickness of the wall of a hollow propeller blade comprising means for supporting said blade in a substantially horizontal position rotatably about its longitudinal axis, an elongated pantograph frame mounted substantially horizontally on said supporting means in a vertical plane containing the longitudinal axis of said blade and capable of longitudinal movement with respect to said blade, said frame including three horizontal arms and three substantially vertical links, the uppermost arm being adapted to be partially disposed within said blade, a source of penetrative radiation mounted on the free end of said arm within said blade and a detector of penetrative radiation supported by one of said vertical links connecting the other two arms of said frame outside said blade and opposite said source.

3. A device for measuring the thickness of the wall of a hollow propeller blade comprising means for supporting said blade rotatably about its longitudinal axis in a substantially horizontal position, an elongated frame mounted on said supporting means in a vertical plane containing the longitudinal axis of said blade and capable of longitudinal movement with respect to said blade, said frame including an arm adapted to be partially disposed within said blade, said arm terminating in a flexible portion, a holder containing a source of penetrative radiation mounted on the free end of the flexible portion of said arm within said blade, the weight of said holder being sufficient to cause the holder to remain in contact with the inner surface of the blade wall, and a detector of penetrative radiation supported by said frame outside said blade and opposite said source.

4. A device for measuring the thickness of the wall of a hollow propeller blade comprising means for supporting said blade rotatably about its longitudinal axis in a substantially horizontal position, an elongated frame mounted on said supporting means in a vertical plane containing the longitudinal axis of said blade and capable of longitudinal movement with respect to said blade, said frame including an arm adapted to be partially disposed within said blade, said arm terminating in a flexible portion, a holder containing a source of gamma rays mounted on the free end of the flexible portion of said arm within said blade, the weight of said holder being sufficient to cause the holder to remain in contact with the inner surface of the blade wall, said holder having side and top walls of a high density, high atomic number metal for absorbing gamma rays emitted from said source in directions other than directly toward the wall of the blade, a detector of gamma rays supported by said frame outside said blade and opposite said source, and resilient means between said detector and said frame for pressing the detector against the outer surface of the blade.

5. A device for measuring the thickness of the wall of a hollow propeller blade comprising a base member, a bearing on said member adapted to be engaged by the shank of the propeller blade so as to hold the blade in a substantially horizontal position capable of being rotated about its longitudinal axis, a framework in the form of a pantograph and comprising a plurality of horizontal arms and a plurality of connecting lateral links, a second bearing on said base member adapted to be engaged by one of said arms so as to support said framework in a vertical plane containing the longitudinal axis of said blade and to provide for longitudinal movement of the framework with respect to said blade, one of the arms of said framework having a free end projecting into said blade through said shank, a source of penetrative radiation attached to the free end of said arm within the blade, and a detector of transmitted penetrative radiation affixed to one of said lateral links so as to be disposed at the outer side of the blade wall opposite said source of radiation.

6. A device for measuring the thickness of the wall of a hollow propeller blade comprising a base member, a bearing on said member adapted to be engaged by the shank of the propeller blade so as to hold the blade in a substantially horizontal position and capable of rotation about its longitudinal axis, a framework in the form of a pantograph and comprising three horizontal arms and three lateral links, a second bearing on said base member adapted to be engaged by one of said arms so as to support said framework in a vertical plane containing the longitudinal axis of said blade and to provide for longitudinal movement of the framework with respect to said blade, the uppermost arm of said framework having a free end projecting into said blade through said shank, a source of penetrative radiation attached to the free end of said arm within the blade, and a detector of transmitted penetrative radiation affixed to said framework so as to be disposed at the outer side of the blade wall opposite said source of radiation, said arms and links being pivotally connected to each other and proportioned so that at substantially any point on said blade where it is desired to measure thickness, a line connecting the source and detector will be perpendicular to the blade wall.

7. A device for measuring the thickness of the wall of a hollow propeller blade, comprising means for supporting said blade rotatably about its longitudinal axis, a pantograph frame also mounted on said supporting means in a plane containing the longitudinal axis of said blade and capable of longitudinal movement with respect to said blade, said frame including longitudinal arms and lateral links, one of said arms being adapted to be partially disposed within said blade, a source of penetrative radiation mounted on the free end of said arm within said blade and a detector of said radiation supported by one of said links outside said blade and opposite said source.

GERHARD HERZOG.

REFERENCES CITED

The following references are of record in the file of this patent:

UNITED STATES PATENTS

| Number | Name | Date |
|---|---|---|
| 2,346,486 | Hare | Apr. 11, 1944 |
| 2,349,429 | Herzog et al. | May 23, 1944 |
| 2,370,163 | Hare | Feb. 27, 1945 |
| 2,396,069 | Zapp | Mar. 5, 1946 |